United States Patent [19]

Cameron

[11] Patent Number: 4,537,839
[45] Date of Patent: Aug. 27, 1985

[54] FUEL CELL AND METHOD OF PURGING A FUEL CELL

[75] Inventor: Donald S. Cameron, Reading, England

[73] Assignee: Johnson Matthey Public Limited Company, London, England

[21] Appl. No.: 552,099

[22] Filed: Nov. 16, 1983

[30] Foreign Application Priority Data

Nov. 23, 1982 [GB] United Kingdom ............... 8233312

[51] Int. Cl.³ .............................................. H01M 8/22
[52] U.S. Cl. ........................................ 429/20; 429/26; 429/34; 429/40
[58] Field of Search ................... 429/12, 19, 20, 26, 429/40, 44, 34

[56] References Cited

U.S. PATENT DOCUMENTS

| | | | |
|---|---|---|---|
| 4,001,041 | 1/1977 | Menard | 429/17 |
| 4,041,210 | 8/1977 | Van Dine | 429/12 |
| 4,128,700 | 12/1978 | Sederquist | 429/17 |

*Primary Examiner*—Anthony Skapars
*Attorney, Agent, or Firm*—Cushman, Darby & Cushman

[57] ABSTRACT

A fuel cell may be purged with inert gas and/or preheated and/or maintained at an elevated temperature by combusting the hydrogen fuel with air and passing the combustion product gases either through the cell or through a heat exchanger for imparting heat either to the electrolyte or to the fuel gases. Preferably the combustor includes a catalyst. The hydrogen can either be taken directly from the fuel supply or the "waste" hydrogen periodically bled from the cell can be used. If the product gases are to be passed into the cell, the stoichiometry of the combustion should be controlled so that hydrogen is absent.

12 Claims, 1 Drawing Figure

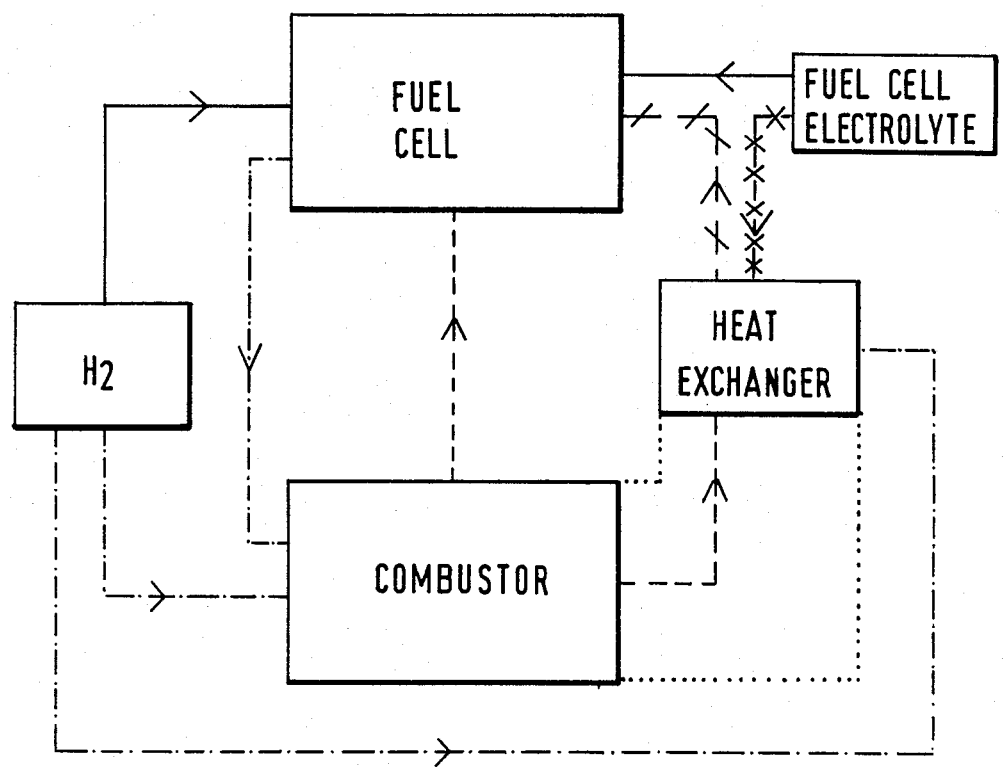

FUEL CELL AND METHOD OF PURGING A FUEL CELL

This invention relates to a method of purging a fuel cell with an inert gas, and to a fuel cell incorporating a combustor for providing an inert gas purge. The invention may also be used for preheating a fuel cell and for maintaining the operating temperature thereof.

A fuel cell is an electrochemical cell for the generation of power wherein the reactants are supplied continuously, conveniently as gases. The reactants comprise an oxidisable fuel, for example hydrogen and an oxidising agent, typically oxygen, either per se or as air. The cell comprises porous electrodes, ie a porous anode at which the fuel is oxidised, and a porous cathode at which the oxidising agent is reduced, and an electrolyte. The electrodes generally carry a coating or deposit of a catalyst for catalysing the electrode reactions. The electrolyte is generally aqueous and may be either acidic or alkaline, and is contained between and retained by the electrodes, which are typically of flat shape. The reactant gases are supplied to compartments at the rear face of the electrodes, that is, remote from the electrolyte. The porosity of the electrodes allows the reactants to diffuse through from the supply compartments to provide a gas/liquid interface within the electrodes while preventing the electrolyte from diffusing back through the electrode to the supply compartment.

In practice, a typical arrangement for power generation is to use a plurality of individual cells arranged in a stack and electrically connected in series so that the power produced at each cell is integrated. Conveniently, the cells are arranged in the stack in a "back to back" configuration so that individual electrode compartments supply two electrodes simultaneously. The stack is provided with means for supplying reactants to the electrode compartments from a common supply. In the art, the term "fuel cell" is generally taken to mean such a stack, including all ancillary equipment, rather than to the individual cells thereof, although sometimes the term "battery" is used to denote the stack of individual cells. In this specification and for the avoidance of confusion, the term "cell" or "fuel cells" is to be understood as meaning either an individual electrochemical cell or a stack or array of such cells and constituting a power generating unit, as the context requires.

During the starting up and shutting down periods of operating a fuel cell, it is desirable to purge the cell with an inert gas such as nitrogen. This is to avoid a build-up of inflammable and/or explosive gas mixtures in the electrode reactant supply compartments and, where a stack of cells is used, to prevent uneven cell voltages within the stack. This requires the availability of an external source of inert gas, however, which is a considerable disadvantage, particularly where weight is important.

During the running periods of fuel cells, it is important to control their operating temperatures to optimise their performance. This applies particularly where the cell is being used at less than full capacity, in which case it is desirable artificially to maintain the temperature at an elevated level so that the cell is able to respond rapidly to sudden surges in power demand. In the case of cells which use hydrogen fuel obtained by the reforming of hydrocarbons, which fuel typically contains a proportion of carbon monoxide, it is essential that elevated cell temperatures are maintained in order to avoid carbon monoxide poisoning of the catalysed electrodes.

The fuel, whether obtained from a reforming process or otherwise, fed into the anode compartments of fuel cells may contain traces of impurity which, if not removed from the cell, would accumulate and may poison the anode reaction sites. Inert contaminants would also result in loss of performance by lowering the fuel partial pressure. Thus it is desirable to exhaust a small proportion (perhaps from 0.1 to 10%) of the fuel from the cell to remove impurities and prevent their accumulation. This exhaustion may take the form either of a steady bleed or of a periodic purge.

It is an object of the present invention to provide for an inert gas fuel cell purge which is independent of the availability of an external inert gas source. It is a further object of the invention to provide for the temperature of a fuel cell to be maintained at an elevated level, typically at or close to the full capacity operating temperature, when working at less than full capacity.

We have now found that hydrogen fuel may be combusted and the combustion gases passed through a fuel cell to act as a purge. Furthermore, the combustion gases may directly or indirectly be made to pre-heat and/or to maintain the cell at an elevated temperature.

Accordingly, the invention provides a method comprising combusting hydrogen with air, the combustion product gases comprising water vapour and nitrogen optionally together with hydrogen wherein the proportion of hydrogen is below the explosive limit and said combustion product gases are for use either as a fuel cell purge gas stream or as a heat exchange medium for the fuel cell reactants or electrolyte for pre-heating a fuel cell or for maintaining a fuel cell at an elevated temperature.

The invention also provides a fuel cell in combination with a combustor for combusting hydrogen with air to yield a gas stream comprising water vapour and nitrogen optionally together with hydrogen at a concentration below the explosive limit and means for passing the gas stream through the fuel cell as a purge and/or as a preheater or through a heat exchanger for imparting heat to a reactant for the fuel cell or to the fuel cell electrolyte.

Preferably the combustor includes a catalyst comprising one or more of the platinum group metals disposed on a support. By "platinum group metals" we mean platinum, rhodium, palladium, ruthenium, iridium and osmium and of these we prefer to use platinum, rhodium and/or palladium. These metals may be present as their oxides, optionally in admixture or alloyed with one or more base metals or oxides thereof. The support may be a ceramic or metallic material either in particulate or monolithic form and suitably treated to render it catalytically active. A metallic support may additionally be in filamentary form, for example randomly orientated wires. The activation treatment may involve the application to the support of a first or intermediate "washcoat" layer followed by the second or final platinum group metal layer. A washcoat layer typically comprises a high surface area catalytically active refractory metal oxide such as $\gamma$ alumina. As an alternative to a washcoated metallic or ceramic support, a carbonaceous material may be used. Such a material may comprise activated carbon or graphite and may take the form of pellets, granules, powder particles or may be in fibrous form such as carbon cloth.

The materials, ie support and platinum group metal, of the catalyst are preferably such as to ensure spontaneous combustion of hydrogen at ordinary room temperatures, or even at temperatures lower than ordinary room temperature. For extremely low temperature operation, an igniter may be included. Such an igniter may take the form of a spark- or glow-producing device or the material of the catalyst support may be electrically resistive so that the support is self-heating upon passage of an electric current.

The hydrogen for combusting in the combustor is conveniently from the same source as the hydrogen for use as fuel for the fuel cell. If the combustor is being used to purge and/or pre-heat the fuel cell, the hydrogen for the combustor may be provided directly from the fuel source whereas, if the combustor is being used to maintain the temperature of a fuel cell in operation, the hydrogen for the combustor may conveniently be taken from the hydrogen bled or purged from the fuel cell as an exhaust to prevent accumulation of contaminants within the cell. This provides an additional advantage in that such hydrogen is otherwise often vented to atmosphere with consequent fire and explosion hazards. In fuel cells which use an integrated reformer for fuel production, such hydrogen is at the present sometimes used to provide heat for the water gas shift reaction which takes place therein and which is endothermic. According to the present invention, at least part of the heat of combustion of the hydrogen may be used for the water gas shift reaction, the balance being used for the maintenance of the fuel cell operating temperature.

The composition of the combustion product gases is variable and depends on the hydrogen:air ratio of the inlet gases. If the product gases are to be used for purging and/or pre-heating a fuel cell, they should be inert, that is, substantially free of hydrogen. The presence of carbon dioxide is tolerable in fuel cells using acid electrolytes but is unacceptable in cells using alkaline electrolytes because of the possible formation therein of carbonates. Any carbon dioxide present should preferably therefore be removed by conventional scrubbing means.

If the product gases are to be used for maintaining the temperature of a fuel cell during operation thereof, the combustion product gases may contain hydrogen provided that the concentration thereof does not exceed the explosive limit. The stoichiometry of the combustion process should preferably be controlled so that the product gases contain from 0 to 4% hydrogen, balance essentially nitrogen, water vapour, and carbon dioxide.

The combustor may be used both for purging of a fuel cell, and pre-heating thereof, prior to start-up, and for temperature maintenance thereof during operation, merely by passing the combustion product gases either through the cell or through a heat exchanger. The heat exchanger may be used either to heat the incoming fuel and/or the electrolyte, where a recirculating electrolyte system is in use. Alternatively, the combustion can take place within the tubes of a heat exchanger. Where catalytic combustion is employed, the heat exchanger surfaces may themselves carry a catalytic coating and/or a catalyst may be located within the tubes.

The gas flow rates of hydrogen and air admitted to the combustor are regulatable by means of needle valves or preset gas jets to control the stoichiometry of the combustion process. The source of hydrogen may be either the fuel cell supply or the exhaust from the anode exhaust bleed or purge, suitable pipework and valves being included to select the desired source at will. The anode exhaust may be metered using a control valve or bleed jet, or periodically purging a larger flow of gas using, for example, a solenoid valve controlled by a timing device. In such a case, control may be exercised by monitoring data from the fuel cell power output to provide for the exhaust to be approximately proportional to the amount of hydrogen consumed by the cell, according to the length of, and intervals between, successive purges.

BRIEF DESCRIPTION OF THE DRAWINGS

A diagrammatic representation of a fuel cell and combustor circuit according to the invention, is illustrated in the accompanying drawing, in which lines in the form _____ depict combustion product gases, _____ depict $H_2$, _____ depict unheated electrolyte, and _____ heated $H_2$/electrolyte.

When the invention is used as a purge and/or as a pre-heater, the combustion product gases may be passed either only through the anode or cathode compartments or through both sets of compartments. When the purge is taking place during a shut-down period, the passage of product gases is either continued for a time sufficient to flush the reactants entirely from the cell, the cell then being allowed to cool down, or the product gases may be cooled before being passed through the cell, in order to promote cooling thereof.

The invention provides a highly convenient means for purging and/or pre-heating, and also maintaining the operating temperature of, a fuel cell and which is entirely independent of the availability of any gas source other than those required as reactants. In particular, the need for a source of nitrogen or other inert gas is avoided. The pre-heating and temperature-maintaining features are advantages not enjoyed by purging arrangements in use hitherto. Furthermore, the invention makes use of "waste" hydrogen which is otherwise often vented to atmosphere.

I claim:

1. A fuel cell in combination with a combustor for combusting hydrogen with air to yield a gas stream comprising water vapour and nitrogen optionally together with hydrogen at a concentration below the explosive limit and means for passing the gas stream through the fuel cell as a purge and/or as a preheater or through a heat exchanger for imparting heat to a reactant for the fuel cell or to the fuel cell electrolyte.

2. A fuel cell in combination with a combustor, as claimed in claim 1, wherein the combustor includes a catalyst selected from the group consisting of platinum, rhodium, palladium, ruthenium, iridium and osmium.

3. A fuel cell in combination with a combustor, as claimed in claim 2, wherein said metals are present in a form selected from the group consisting of oxides, oxides in admixture with one or more base metals or base metal oxides, and oxides alloyed with one or more base metals or base metal oxides.

4. A fuel cell in combination with a combustor, as claimed in claim 1 wherein the catalyst is supported on a support selected from the group consisting of particulate ceramic materials, monolithic ceramic materials, particulate metallic materials, monolithic metallic materials, filamentary metallic materials and carbonaceous material.

5. A fuel cell in combination with a combustor, as claimed in claim 4, wherein the support is coated with a washcoat layer comprising high surface area catalytically active refractory metal oxide.

6. A fuel cell in combination with a combustor, as claimed in claim 1, further including an igniter for initiating combustion.

7. A fuel cell in combination with a combustor, as claimed in claim 1, having a common source of hydrogen for use in the combustor and for use as fuel in the fuel cell.

8. A fuel cell in combination with a combustor, as claimed in claim 1, having means for passing hydrogen from the fuel cell to the combustor for combustion.

9. A fuel cell in combination with a combustor, as claimed in claim 1, wherein the fuel cell further comprises an integrated reformer for fuel production and hydrogen in the fuel cell, for providing heat for an endothermic water gas shift reaction.

10. A fuel cell in combination with a combustor, as claimed in claim 1, wherein the combustor is included in the heat exchanger.

11. A fuel cell in combination with a combustor, as claimed in claim 1, wherein the tubes of the heat exchanger are catalytically coated.

12. A fuel cell in combination with a combustor, as claimed in claim 1, wherein said hydrogen is removable from the fuel cell via a control valve, a bleed jet, or a timed solenoid valve.

* * * * *